(12) United States Patent
Knuth

(10) Patent No.: US 10,480,587 B2
(45) Date of Patent: Nov. 19, 2019

(54) SELF-ALIGNING DRIVESHAFT COUPLER

(71) Applicant: Deere & Company

(72) Inventor: Thomas M. Knuth, Thomson, GA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/235,866

(22) Filed: Aug. 12, 2016

(65) Prior Publication Data

US 2016/0348731 A1    Dec. 1, 2016

Related U.S. Application Data

(63) Continuation-in-part of application No. 14/620,953, filed on Feb. 12, 2015, now Pat. No. 10,253,821.

(51) Int. Cl.
*F16D 3/38*    (2006.01)
*A01B 71/06*    (2006.01)
(Continued)

(52) U.S. Cl.
CPC .............. *F16D 3/387* (2013.01); *A01B 71/06* (2013.01); *B60K 17/28* (2013.01); *F16D 1/108* (2013.01);
(Continued)

(58) Field of Classification Search
CPC . F16D 1/108; F16D 1/112; F16D 3/16; F16D 3/387; F16D 3/2057; F16D 3/34; F16D 3/48; F16D 7/042; F16D 7/044; F16D 7/046; F16D 1/116; F16D 2001/103; F16D 43/02; F16D 43/26; A01B 71/06; A01D 69/08; B60K 17/28; B60Y 2200/221;
(Continued)

(56) References Cited

U.S. PATENT DOCUMENTS 2,885,232 A    5/1959   Eberly
2,948,559 A *  8/1960   Recker .................... F16D 1/116
                                                              279/77

(Continued)

FOREIGN PATENT DOCUMENTS

CH        700130 A1 *  7/2010  ............. F16D 7/046
DE      3141353 A1 *  5/1983  ............. F16D 1/116
(Continued)

OTHER PUBLICATIONS

European Search Report in related application No. EP15190156.8, dated Jun. 28, 2016 (5 pages).
(Continued)

*Primary Examiner* — Josh Skroupa

(57) ABSTRACT

A self-aligning driveshaft coupler includes a receiving clutch mounted to a driveshaft and a locking clutch assembly mounted to an implement. The locking clutch assembly includes a collar and a yoke that rotate together, and a spring between the collar and the yoke. A locking pin may be pivotably attached to the yoke to move a projection on the locking pin in and out of the retaining groove. A plurality of drive pins extend axially from the collar. The spring biases the drive pins into engagement with the receiving clutch when the locking pin projection is in the retaining groove and the output shaft and receiving clutch are rotated less than 180 degrees.

12 Claims, 7 Drawing Sheets

(51) Int. Cl.
*F16D 1/108* (2006.01)
*B60K 17/28* (2006.01)
*F16D 3/16* (2006.01)

(52) U.S. Cl.
CPC .............. *F16D 3/16* (2013.01); *A01B 71/063* (2013.01); *B60Y 2200/221* (2013.01); *Y10S 464/901* (2013.01); *Y10S 464/905* (2013.01)

(58) Field of Classification Search
CPC ............. Y10T 403/598; Y10T 403/599; Y10T 403/7033; Y10T 403/7088; F16B 2/06; F16B 2/065; F16B 21/18; F16B 21/186; F16B 21/12; Y10S 464/901; Y10S 464/905
See application file for complete search history.

(56) References Cited

U.S. PATENT DOCUMENTS

| | | | |
|---|---|---|---|
| 3,260,541 A | 7/1966 | Sandler et al. | |
| 3,357,206 A | 12/1967 | Christie | |
| 3,551,013 A * | 12/1970 | Trojanowski | F16D 1/116 285/316 |
| 3,733,854 A * | 5/1973 | Young | F16D 1/116 464/171 |
| 3,747,966 A | 7/1973 | Wilkes et al. | |
| 3,822,951 A * | 7/1974 | Bornzin | A01D 69/002 403/316 |
| 4,289,414 A | 9/1981 | Recker | |
| 4,392,759 A * | 7/1983 | Cook | F16D 1/116 403/11 |
| 4,402,626 A | 9/1983 | Recker | |
| 4,492,292 A | 1/1985 | Thor | |
| 4,540,305 A | 9/1985 | Geisthoff | |
| 4,553,652 A * | 11/1985 | Fallos | F16D 7/046 192/18 R |
| 4,645,372 A * | 2/1987 | Suzuki | F16B 21/165 403/316 |
| 4,900,181 A | 2/1990 | Geisthoff | |
| 4,934,471 A | 6/1990 | Tanaka et al. | |
| 4,960,344 A | 10/1990 | Geisthoff et al. | |
| 4,993,992 A * | 2/1991 | Kriegel | F16D 1/101 464/137 |
| 5,048,652 A * | 9/1991 | Cycon | F16D 43/14 192/105 CD |
| 5,303,790 A | 4/1994 | Coleman | |
| 5,472,073 A | 12/1995 | Hay | |
| 5,522,669 A | 6/1996 | Recker | |
| 5,536,047 A * | 7/1996 | Detable | F16L 37/084 285/308 |
| 5,658,087 A | 8/1997 | Butkovich et al. | |
| 5,667,330 A | 9/1997 | Henkel et al. | |
| 5,820,291 A * | 10/1998 | Lutz | F16D 1/116 29/517 |
| 5,941,126 A * | 8/1999 | Hirsch | F16H 63/32 29/525.03 |
| 7,093,681 B2 * | 8/2006 | Strain | F16D 1/112 180/14.2 |
| 7,641,415 B2 | 1/2010 | Fox et al. | |
| 7,997,362 B2 * | 8/2011 | Herchenbach | A01B 71/063 180/14.4 |
| 8,364,363 B2 | 1/2013 | Nakamura et al. | |
| 2009/0134350 A1 * | 5/2009 | Ammunson | F16D 1/10 251/304 |
| 2013/0336719 A1 * | 12/2013 | Baus | F16B 2/16 403/379.5 |

FOREIGN PATENT DOCUMENTS

| | | |
|---|---|---|
| DE | 3141353 A1 | 5/1983 |
| DE | 19831273 A1 | 1/2000 |
| EP | 1967060 A1 | 10/2008 |
| EP | 1985168 A1 | 10/2008 |
| EP | 2564680 A1 | 3/2013 |

OTHER PUBLICATIONS

"Power Lock, Coupling the PTO shaft comfortably from the drivers seat." Pöttinger Agricultural Technology [online article]. Retrieved on Feb. 12, 2015. Retrieved from the Internet: <http://www.poettinger.at/en_UK/Newsroom/Artikel/1582>.
European Search Report issued in counterpart application No. 17185388.0 dated Jan. 10, 2018. (11 pages).

* cited by examiner

SELF-ALIGNING DRIVESHAFT COUPLER

CROSS REFERENCE TO RELATED APPLICATIONS

This application is a continuation-in-part of prior application Ser. No. 14/620,953, filed Feb. 12, 2015.

FIELD OF THE INVENTION

This invention relates generally to coupler devices between tractor power take offs and agricultural implements, and specifically to quick connect couplers for coupling power take offs to driveshafts of rear mounted implements.

BACKGROUND OF THE INVENTION

Tractors may be equipped with a power take off (PTO) that transmits rotary power from an engine to an implement. The most common location for the PTO shaft is at the rear of the tractor, but some tractors have auxiliary PTO shafts at other locations. The direction of rotation, rotational speed, approximate location and exact dimensions of the PTO shaft are standardized to provide ability to interchange between power shafts on various implements made by different manufacturers. PTO shafts typically rotate at 540 rpm, 1000 rpm, 2100 rpm, or more than one speed.

To engage the PTO to the shaft or drive line of a rear mounted implement, the PTO may have the ability to telescope. After the tractor is in proper position, the tractor operator may manually extend the telescoping PTO and employ various coupler devices to couple the PTO to the implement power shaft. This requires getting down off the seat or operator station of the tractor, and it can be quite time consuming to couple the power take off to the implement manually. Coupling a tractor PTO to the driveline of an implement also can be difficult and dirty.

In the past, PTOs have been coupled to implement drivelines using splines to transmit rotational power, along with an additional keeper to secure the coupled parts and resist thrust loads. Often it is difficult to find the correct alignment for the female spline of the drive line and the male spline of the tractor PTO. Sometimes it is necessary for the operator to turn the implement drive line until the correct alignment is found.

After correct alignment is accomplished, the operator still must hold back a driveline locking feature until the implement shaft or driveline is in place. It may be difficult to manipulate the lock back feature or turn the implement driveline to obtain correct alignment between the PTO and the implement shaft.

A need exists for an improved apparatus and method for coupling a PTO on a tractor to the shaft or driveline of an implement. There is a need for greater operator safety and ease of use when hooking up a tractor PTO to the shaft of an implement. There is a need for a self-aligning driveshaft coupler that may be used with standard PTO driveshafts on tractors, and with standard shafts or drivelines on a variety of different implements. There also is a need for a self-aligning driveshaft coupler that does not require any external energy source such as electricity, hydraulics or pneumatics.

SUMMARY OF THE INVENTION

A self-aligning driveshaft coupler includes a receiving clutch having a neck with a spiral channel, and a base with a plurality of receiving holes. A locking clutch assembly has an inwardly extending locking pin that enters and follows the spiral channel and pulls the locking clutch assembly axially toward the base as the receiving clutch rotates, and a plurality of drive pins that enter the receiving holes to rotatably engage the locking clutch assembly to the receiving clutch.

In a second embodiment, the receiving clutch has a retaining groove around its outer surface, and the locking clutch assembly has a pivotable locking pin with a projection that enters the retaining groove when the locking clutch assembly slides onto the receiving clutch. A collar has a plurality of drive pins that enter the receiving holes after rotating the receiving clutch less than 180 degrees to rotatably engage the locking clutch assembly to the receiving clutch.

The self-aligning driveshaft coupler provides greater operator safety and ease of use when hooking up a tractor PTO to the shaft of an implement. It may be used with standard PTO driveshafts on tractors, and with standard shafts or drivelines on a variety of different implements. The self-aligning driveshaft coupler also does not require any external energy source such as electricity, hydraulics or pneumatics.

DESCRIPTION OF THE PREFERRED EMBODIMENT

Figure 1:
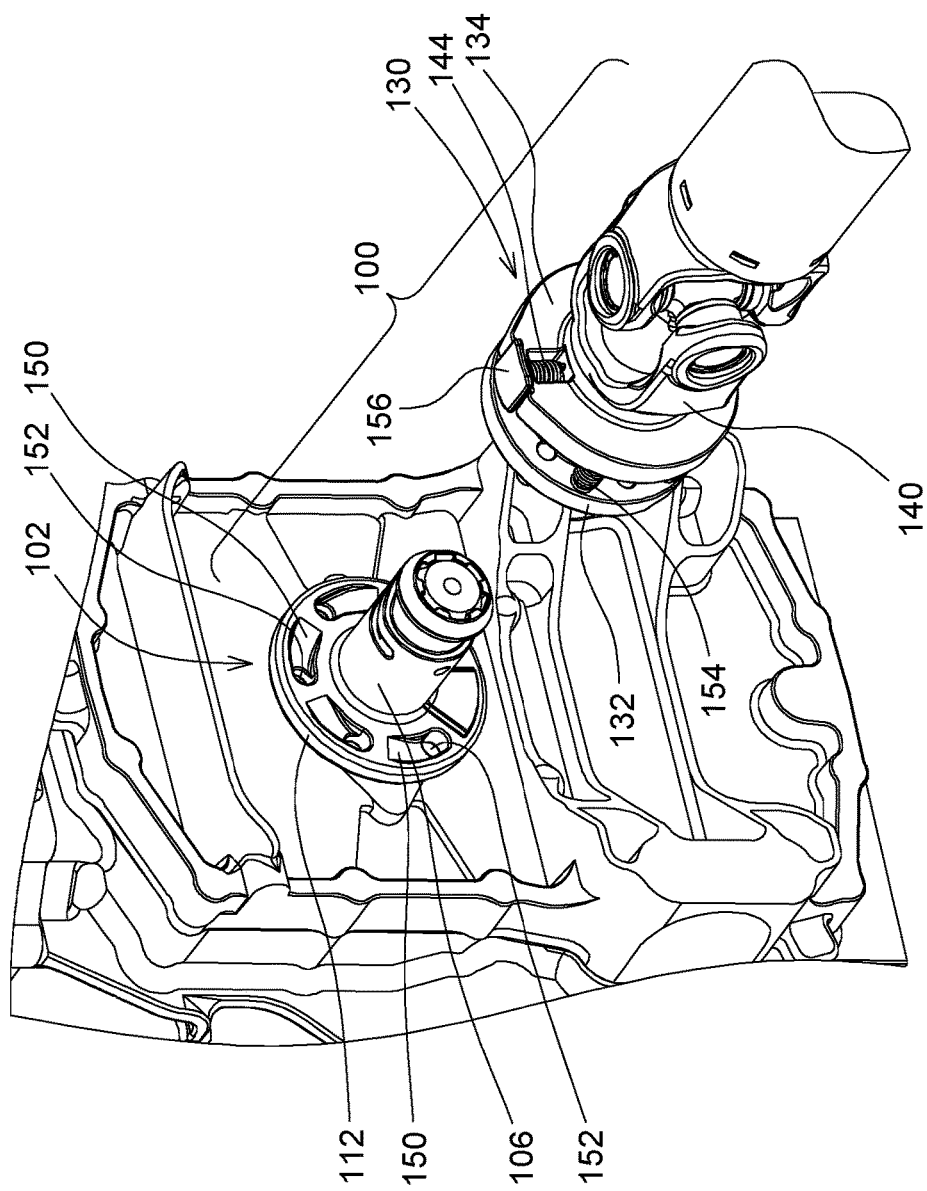
FIG. 1 is a perspective view of a small and/or compact tractor with a self-aligning driveshaft coupler according to one embodiment of the invention.
Figure 2:
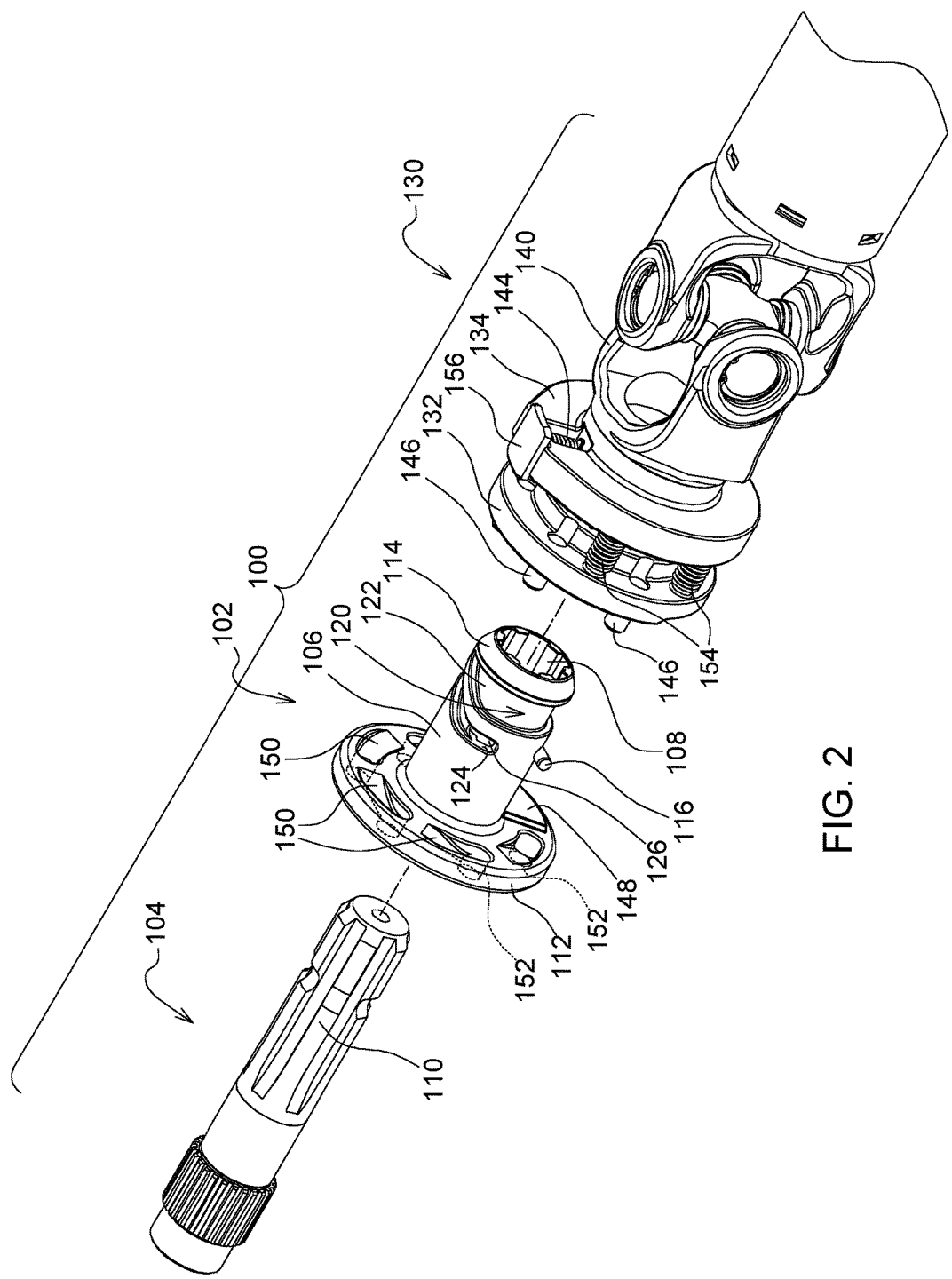
FIG. 2 is a perspective view of a self-aligning driveshaft coupler before connection according to one embodiment of the invention.

As shown in FIGS. 1-5, self-aligning driveshaft coupler 100 may be used to connect a tractor PTO to a driveline or shaft of a rear mounted implement. The self-aligning driveshaft coupler may include receiving clutch 102 installed and mounted to tractor PTO output shaft 104. The receiving clutch may include neck 106 with internal splines 108 that fit around and engage the external splines 110 on a standard tractor PTO output shaft. The neck may be integral with base or flange 112. The outer end 114 of the neck may have a sloped lip that does not extend beyond the end of the tractor PTO output shaft. The receiving clutch may be secured to the tractor PTO output shaft using pin 116 inserted through radial hole 118 in the neck and a corresponding hole in the tractor PTO output shaft. Other similar devices may be used to secure the receiving clutch axially to the tractor PTO output shaft.

In one embodiment, the self-aligning driveshaft coupler may include a spiral channel 120 extending up to or about 360 degrees around the outer circumferential surface of neck 106. The spiral channel may have a wide first end 122 near the outer end 114 of the neck, and may spiral around the neck's outer circumference toward base or flange 112. The spiral channel may taper down to a narrower second end 124, and may terminate between the outer end 114 and base or flange 112. At or near the second end of the spiral channel, a radial slot 126 may be dimensioned to receive locking pin 128.

In one embodiment, the self-aligning driveshaft coupler may include locking clutch assembly 130 on an implement, including a first ring shaped member 132 and a second ring shaped member 134. The first and second ring shaped members may be slidably engaged together with internal splines or teeth 136 and external splines or teeth 138 for rotation together, and also may be retained axially together by retainer ring 158. The second ring shaped member may be secured to the implement driveline, shown here as welded together or cast to form an integral part along with universal joint 140.

Figure 3:
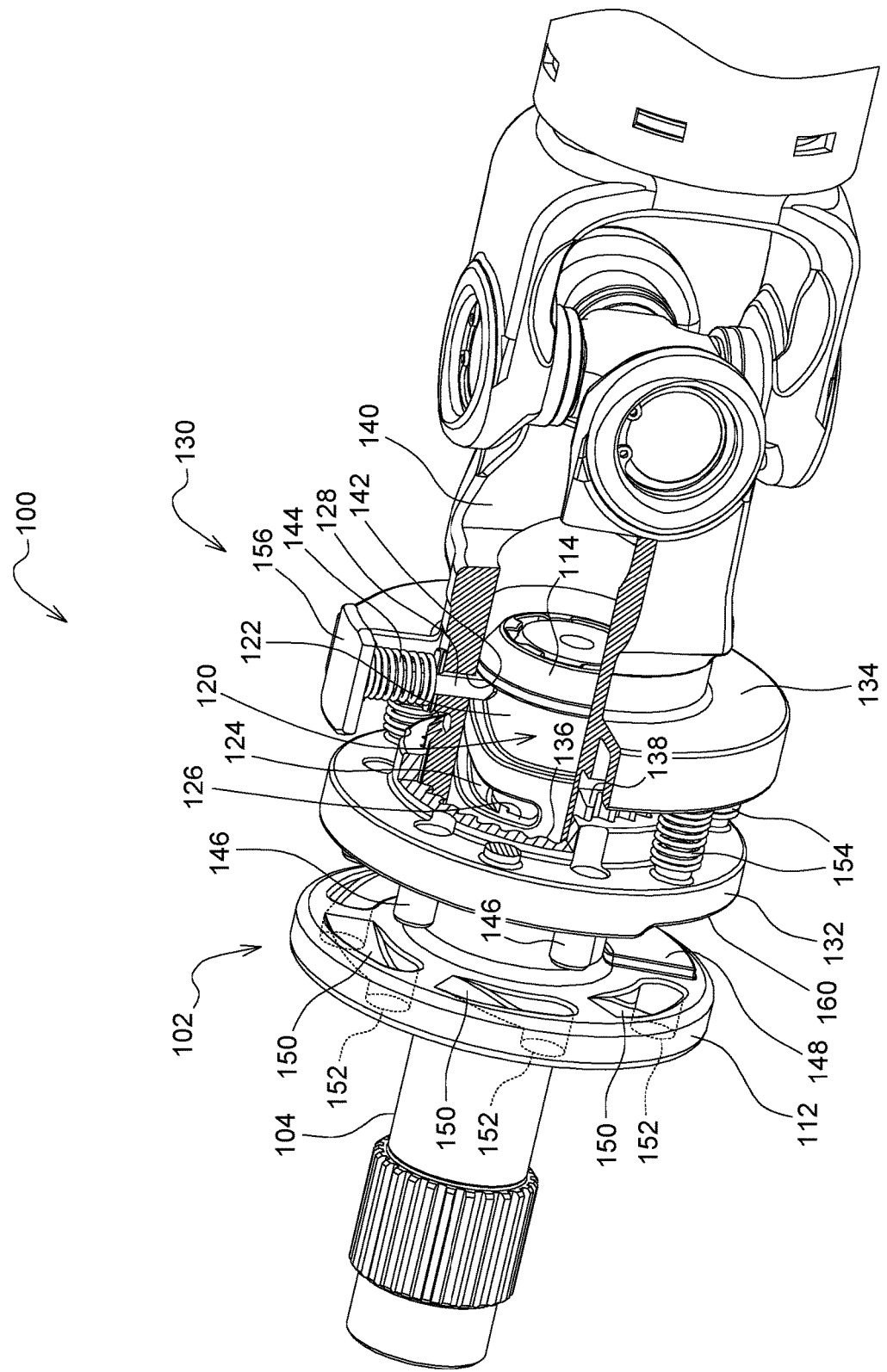
FIG. 3 is a perspective view, partially in section, of a self-aligning driveshaft coupler during initial connection, according to one embodiment of the invention.

In one embodiment, the self-aligning driveshaft coupler may include locking pin 128 slidably mounted in radial hole 142 in the second ring shaped member 134. The operator may start connecting the self-aligning driveshaft coupler by picking up the locking clutch assembly 130 and sliding it axially onto receiving clutch 102. The operator may move the locking clutch assembly far enough to slide locking pin 128 over the sloped lip at the outer end 114 of neck 106 and into the first wide end 122 of spiral channel 120, as shown in FIG. 3. Or the operator may retract locking pin 128 using release button or lever 156, until the locking pin reaches spiral channel 120. Spring 144 may be mounted around the locking pin and may urge the locking pin radially into the first wide end of the channel. The operator then may operate the tractor to rotate PTO output shaft 104. As the PTO output shaft rotates up to about 360 degrees or one complete revolution, spiral channel 120 pulls locking pin 128, and locking assembly 130, further onto receiving clutch 102.

Figure 4:
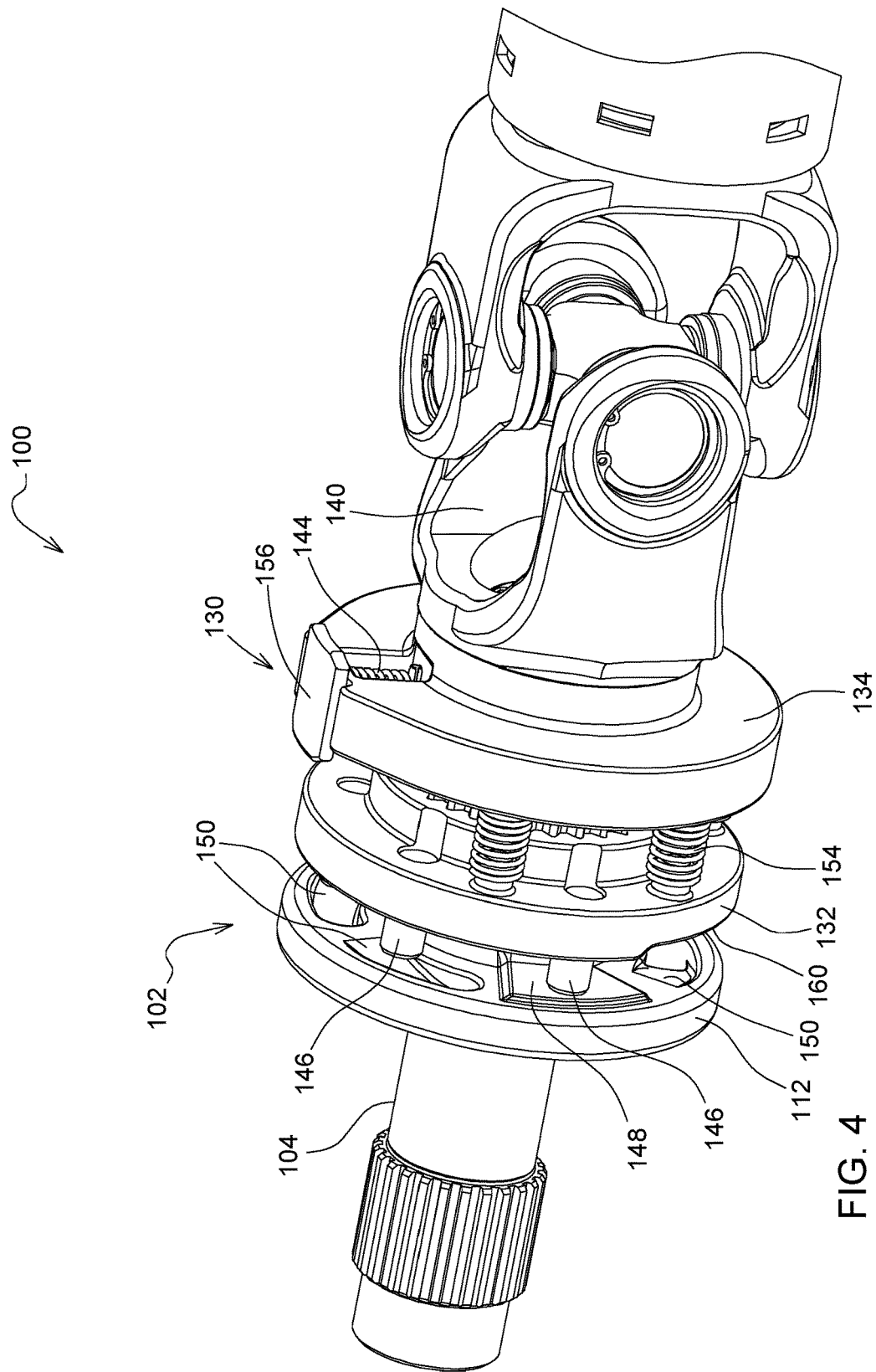
FIG. 4 is a perspective view of a self-aligning driveshaft coupler during later connection, according to one embodiment of the invention.

In one embodiment, the self-aligning driveshaft coupler may include a plurality of drive pins 146 that project axially from first ring shaped member 132 toward receiving clutch 102. For example, the first ring shaped member may have five drive pins. As shown in FIG. 3, while locking pin 128 is in the first wide end of the spiral channel, the drive pins may be spaced from the base or flange 112 of the receiving clutch. As the tractor PTO output shaft rotates, the channel pulls the locking pin and the locking clutch assembly further onto the receiving clutch. The first and second ring shaped members advance axially toward the receiving clutch. For part of a rotation (for example, about 60 degrees), the first ring shaped member may stop advancing axially until drive pins 146 reach and contact base or flange 112. Optionally, as shown in FIG. 4, one of drive pins 146 may contact a raised portion 148 on the base or flange, while the other drive pins may remain spaced from the base or flange.

Figure 5:
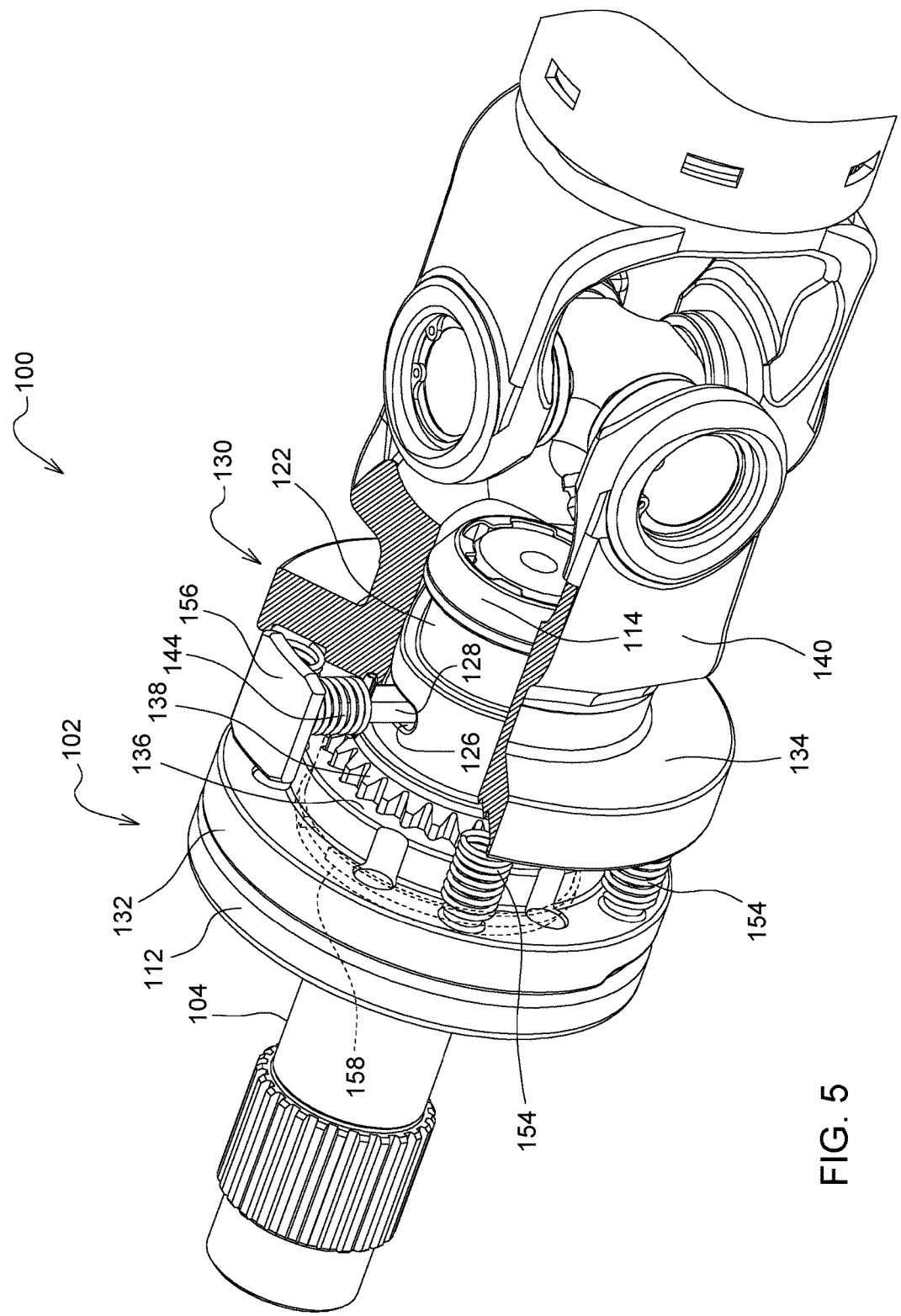
FIG. 5 is a perspective view, partially in section, of a self-aligning driveshaft coupler after connection according to one embodiment of the invention.

In one embodiment, the self-aligning driveshaft coupler may include a plurality of ramps 150 with a receiving hole 152 at the bottom end of each ramp. As the tractor PTO output shaft continues rotating the first ring shaped member again advances axially so that all of the drive pins 146 may contact the base or flange 112 adjacent the start of each ramp 150. Each ramp may be less than about 60 degrees around the base or flange. Springs 154 may be positioned between the first ring shaped member and the second ring shaped member. As shown in FIG. 5, the springs may urge the first ring shaped member axially toward the receiving member, and drive pins 146 down the ramps into receiving holes 152. Optionally, the first ring shaped member may have a mating surface 160 where raised portion 148 may fit.

In one embodiment, the self-aligning driveshaft coupler may include locking pin 128 that may enter radial slot 126 at or nearly the same time as drive pins 146 enter receiving holes 152. Spring 144 may urge the locking pin into radial slot 126. To disconnect the self-aligning driveshaft coupler, the operator may use driveshaft release button 156, or a release lever, to pull the locking pin out from the radial slot. Once the locking pin is released, the locking clutch assembly may slide axially off the receiving clutch.

Figure 6:
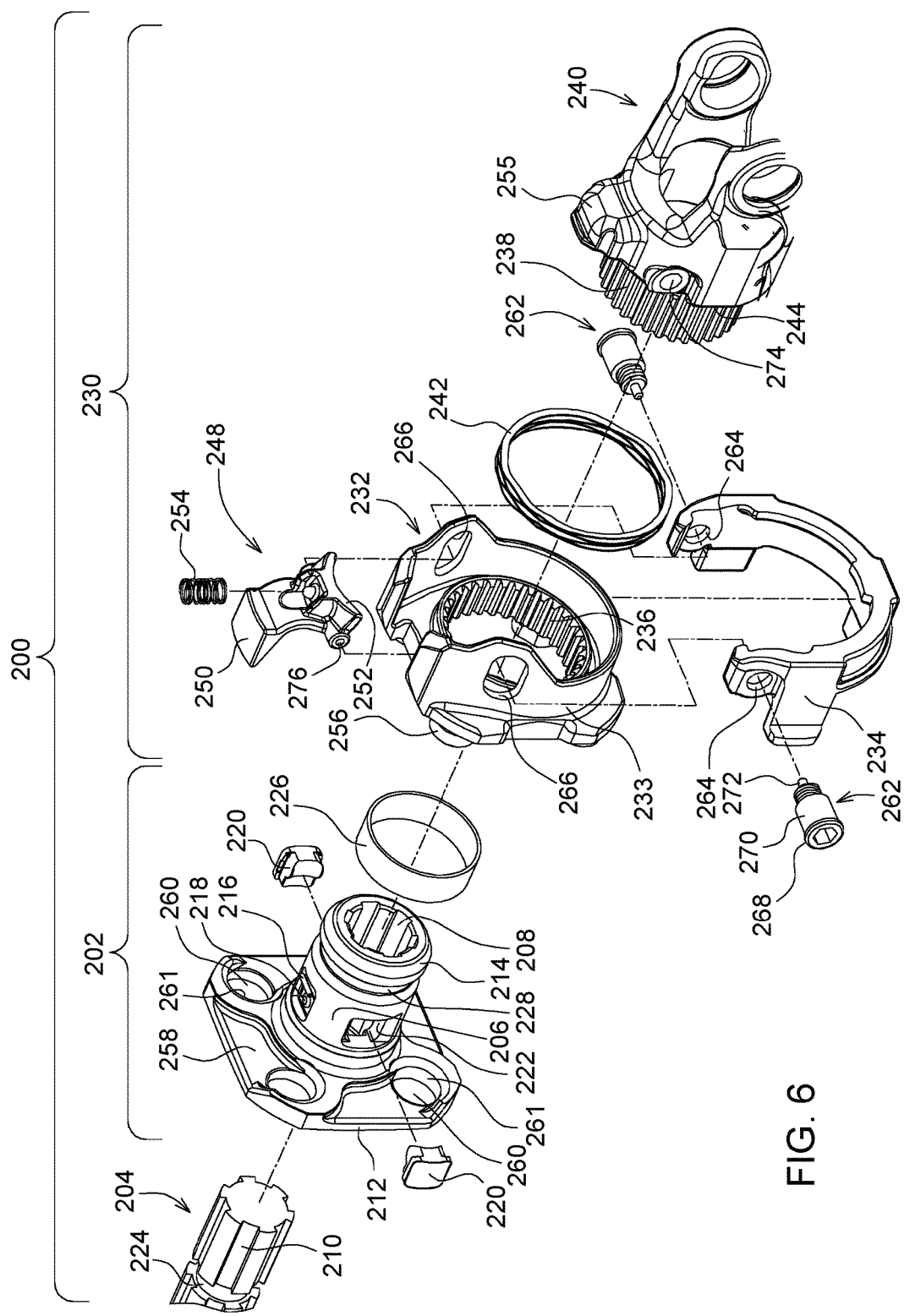
FIG. 6 is an exploded perspective view of a self-aligning driveshaft coupler before connection according to a second embodiment of the invention.
Figure 7:
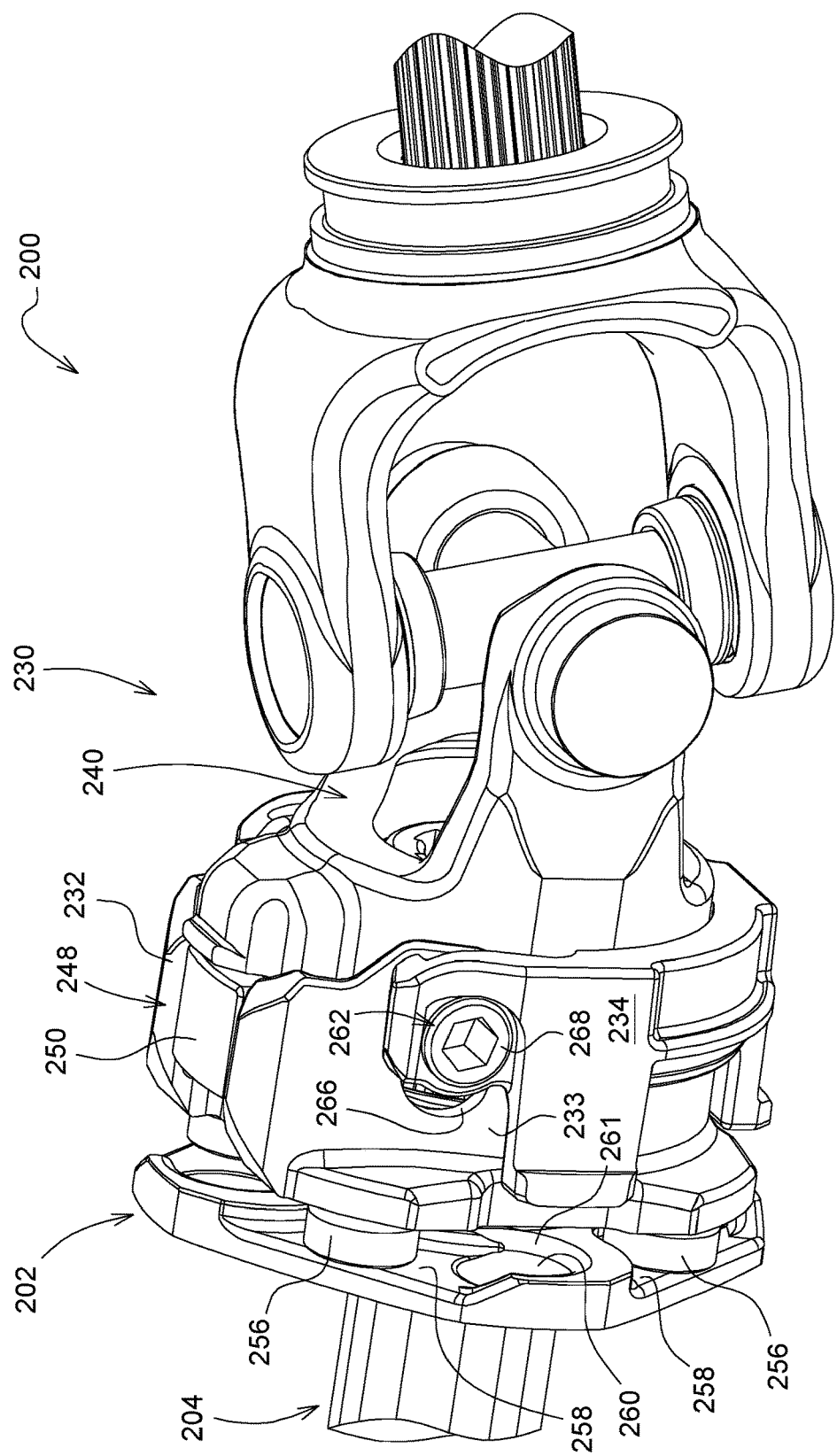
FIG. 7 is a perspective view of a self-aligning driveshaft coupler during connection, according to a second embodiment of the invention.

In a second embodiment shown in FIGS. 6-7, self-aligning driveshaft coupler 200 may include receiving clutch 202 installed and mounted to tractor PTO output shaft 204. The receiving clutch may include neck 206 with internal splines 208 that fit around and engage the external splines 210 on a standard tractor PTO output shaft. The neck may be integral with base or flange 212. The outer end 214 of the neck may have a sloped lip that does not extend beyond the end of the tractor PTO output shaft. The receiving clutch may be secured to the tractor PTO output shaft using at least one retainer 220. The retainers may be inserted into slots 222 in the neck and may engage recess 224 on the tractor PTO output shaft. Additionally, retaining ring 226 may slide over the neck to hold the retainers in place. Retaining spring 216 may be held in by rivet 218 to restrain the retaining ring. Other similar devices may be used to secure the receiving clutch to the tractor PTO output shaft such as a clamping device. Alternatively, receiving clutch 202 may be an integral part of the output shaft on the tractor without any retaining device such as retainer 220 and/or retaining ring 226.

In a second embodiment, the self-aligning driveshaft coupler may include locking clutch assembly 230 on an implement. The locking clutch assembly may include collar 232 with protective sleeve 233 and drive pins 256, and grip 234 that an operator may hold to position locking clutch assembly 230 onto receiving clutch 202. The collar may have internal splines 236 on its internal circumferential surface that slidably engage external splines 238 on yoke 240 for rotation together. The yoke may be attached to the implement using a cross bearing or CV joint.

In a second embodiment, the self-aligning driveshaft coupler may include locking pin 248 pivotably mounted to yoke 240. The operator may connect the self-aligning driveshaft coupler by sliding locking clutch assembly 230 onto receiving clutch 202. Locking pin 248 pivots when it reaches the sloped lip at the outer end 214 of neck 206, and locking projection 252 moves into retaining groove 228. Retaining groove 228 may extend around the outer circumferential surface of neck 106 adjacent outer end 214. Spring 254 may be mounted between locking pin 248 and cap 255 on yoke 240. Spring 254 may urge locking pin 248 to pivot so locking pin projection 252 enters and remains in retaining groove 228. Alternatively, the reaction force of the locking pin 248 may retain the locking clutch assembly 230 onto receiving clutch 202. The locking pin also may include driveshaft release button or lever 250 that an operator may press to pivot the locking pin sufficiently to compress spring 254 and move locking pin projection 252 out from retaining groove 228.

In a second embodiment, the self-aligning driveshaft coupler may include a plurality of drive pins 256 that project axially from collar 232 toward receiving clutch 202. For example, the collar may have four drive pins. The base or flange of the receiving clutch may include a plurality of recesses 258 with a receiving hole 260 at one end of recess. When the locking pin is in the retaining groove, the operator may rotate the PTO output shaft and locking clutch assembly, so that each drive pin 256 slides around and extends into one of the recesses due to spring 242. If the collar has four drive pins, the PTO output shaft and locking clutch assembly may be rotated less than 90 degrees, because each recess is 90 degrees around the base or flange. Similarly, three drive pins would require rotating the PTO output shaft and locking clutch assembly less than 120 degrees, or two drive pins would require rotating it 180 degrees. Stop 261 at an end of each recess 258 may stop the relative motion of the receiver 202 and locking clutch assembly 230. Spring 242, positioned between collar 232 and step 244 on yoke 240, may be compressed until the locking pin projection is in the retaining groove. Spring 242 then may extend to urge drive pins 256 against the recesses 258 and engage receiving holes 260 at the ends of the recesses. Spring 242 may include one or more springs, or may be a single spherical wave spring as shown in FIGS. 6-7.

In a second embodiment, the locking clutch assembly of the self-aligning driveshaft coupler may include grip 234. Grip 234 may be a generally C-shaped member that extends at least partially around the protective sleeve 233 on the outer surface of collar 232. Retaining pins 262 may attach grip 234 and collar 232 to yoke 240, and enable the collar to slide axially as drive pins 256 enter and engage receiving holes 260. Retaining pins 262 also may pivotably mount locking pin 248 to the yoke. For example, each retaining pin 262 may have a head 268 and a first portion 270 inserted through hole 264 in grip 234, through slot 266 in collar 232, and into threaded hole 274 in yoke 240. Additionally, each retaining pin 262 may have a second portion 272 with a smaller diameter that may be inserted into hole 276 in the side of locking pin 248.

Having described a preferred embodiment, it will become apparent that various modifications can be made without departing from the scope of the invention as defined in the accompanying claims. For example, the self-aligning driveshaft coupler may be used on mid-mount or front-mount PTOs or other agricultural equipment.

The invention claimed is:

1. A self-aligning driveshaft coupler, comprising:
an internally splined receiving clutch mounted on an externally splined tractor PTO output shaft and having a neck with a retaining groove, and a base with a plurality of holes;
a locking clutch assembly mounted to an implement and engaging the receiving clutch without contacting the external splines of the tractor PTO output shaft;
a locking pin attached to the locking clutch assembly and removably engaging the retaining groove;
a collar attached to the locking clutch assembly and slideable axially with respect to the locking clutch assembly while the locking pin is engaged; and
a plurality of drive pins extending axially from the collar, a plurality of springs biasing the drive pins into the holes in the receiving clutch base once the locking pin is in the retaining groove and the tractor PTO output shaft and receiving clutch are rotated together less than one revolution before rotating the locking clutch assembly.

2. The self-aligning driveshaft coupler of claim 1 further comprising a C-shaped grip mounted around the outer surface of the collar; the collar being slideable axially with respect to the grip.

3. The self-aligning driveshaft coupler of claim 1 wherein the receiving clutch has a plurality of recesses with each recess extending partially around an outer edge of the base, and a hole at an end of each recess for engaging one of the drive pins.

4. The self-aligning driveshaft coupler of claim 1 further comprising a spring urging the locking pin into the retaining groove.

5. The self-aligning driveshaft coupler of claim 1 further comprising a release button on the locking pin to pivot the locking pin and move the projection out of the retaining groove.

6. A self-aligning driveshaft coupler, comprising:
a receiving clutch mounted over an externally splined tractor PTO output shaft having a neck with an outer surface, a retaining groove around the outer surface, and a base with a plurality of receiving holes; and
a locking clutch assembly on an implement yoke having a pivotable locking pin with a projection that enters the retaining groove when the locking clutch assembly slides onto the receiving clutch, a collar that is slideable relative to the locking clutch assembly with a plurality of drive pins that are spring biased to move axially into the receiving holes after the pivotable locking pin is in the retaining groove by rotating the receiving clutch less than one revolution before the locking clutch assembly rotates.

7. The self-aligning driveshaft coupler of claim 6 further comprising a plurality of recesses around the edge of the base for each of the receiving holes.

8. The self-aligning driveshaft coupler of claim 6 further comprising at least one retaining pin extending through a slot in the collar and providing a pivot axis for the pivotable locking pin, and sliding of the collar.

9. The self-aligning driveshaft coupler of claim 6 further comprising a C-shaped grip pivotably mounted around the collar.

10. A self-aligning driveshaft coupler, comprising:
a locking clutch assembly on an implement yoke and a receiving clutch on an externally splined PTO output shaft;
a plurality of drive pins extending axially from a collar that is slideably mounted to the locking clutch assembly;
a locking pin pivotably mounted on the locking clutch assembly;
a retaining groove on the receiving clutch that the pivotable locking pin enters when the receiving clutch slides onto the locking clutch assembly and rotating the receiving clutch less than one revolution before rotating the locking clutch assembly, and a plurality of springs urging the plurality of axially extending drive pins to enter a plurality of receiving holes in the receiving clutch, whereby the locking clutch assembly is rotatably engaged to the receiving clutch without engaging the external splines on the PTO output shaft.

11. The self-aligning driveshaft coupler of claim 10 wherein the pivotable locking pin is spring biased into the retaining groove.

12. The self-aligning driveshaft coupler of claim 10 further comprising a release button or lever to move the pivotable locking pin out of the retaining groove.

* * * * *